E. PHILLIPSON.
ELECTRIC FAN.
APPLICATION FILED MAY 21, 1919.
1,328,055.
Patented Jan. 13, 1920.
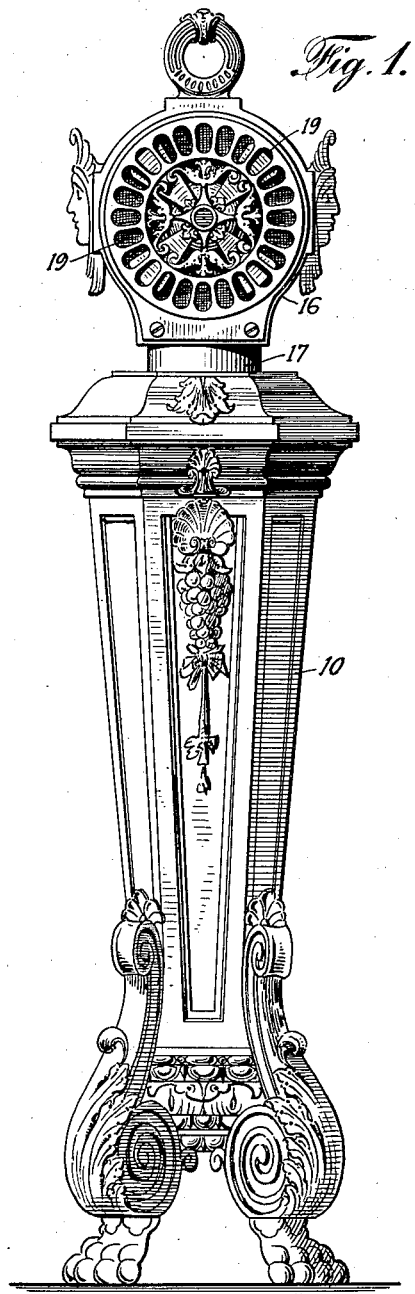
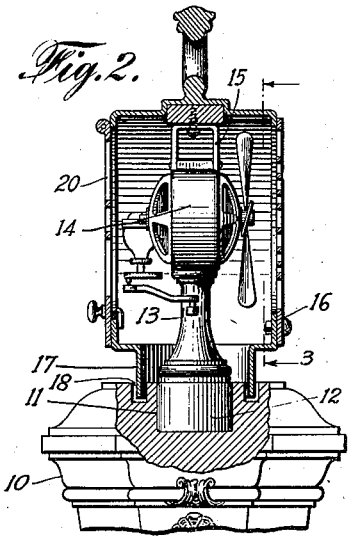
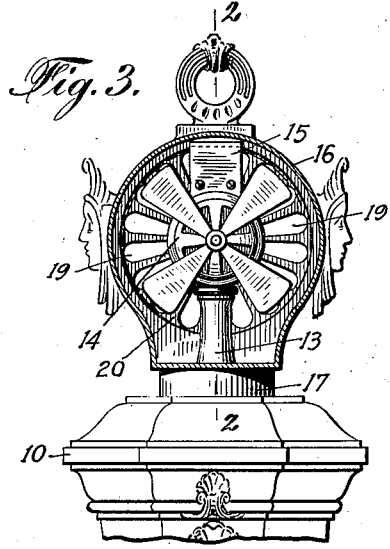
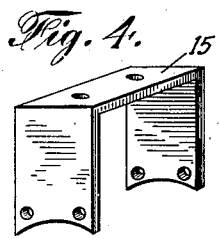
Inventor
Emil Phillipson

UNITED STATES PATENT OFFICE.

EMIL PHILLIPSON, OF NEW YORK, N. Y., ASSIGNOR TO PLANT & COMPANY, OF NEW YORK, N. Y., A FIRM.

ELECTRIC FAN.

1,328,055.   Specification of Letters Patent.   Patented Jan. 13, 1920.

Application filed May 21, 1919. Serial No. 298,614.

*To all whom it may concern:*

Be it known that I, EMIL PHILLIPSON, a citizen of the United States, residing at the city of New York, borough of the Bronx, Bronx county, in the State of New York, have invented certain new and useful Improvements in Electric Fans, of which the following is a full, clear, and exact specification.

This invention relates to improvements in electric fans and the same has for its object to provide an electric fan which will be ornamental in its appearance.

Further, said invention has for its object to provide an electric fan having an inclosing, perforated housing.

Further, said invention has for its object to provide an electric fan comprising an oscillatable or rotatable portion, and having a perforated housing secured to the oscillatable or rotatable portion and inclosing the electric fan.

Further, said invention has for its object to provide a pedestal, and an electric fan removably supported thereby, and having a perforated housing secured thereto and inclosing the same.

Other objects will in part be obvious, and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawing forming part of this specification, wherein like numerals of reference indicate like parts, Figure 1 is a front elevational view of one form of an apparatus constructed according to and embodying my said invention;

Fig. 2 is a detail sectional view taken on the line 2—2 of Fig. 3;

Fig. 3 is a detail sectional view taken on the line 3—3 of Fig. 2, and

Fig. 4 is a detail perspective view of the yoke which supports the housing.

Referring to the drawing, 10 indicates a stand or pedestal, of any desired size and shape, having a recess 11 provided in its upper portion. Removably disposed within the recess 11 is a support 12 upon which is mounted an electric fan, comprising a fixed lower portion or base 13, and an upper portion 14 movably supported thereon. The electric fan 13, 14, is of the usual well known type in which the upper portion 14 oscillates or rotates relatively to the base 13, in order that the direction of the current of air produced by the fan will be continually changing.

A yoke 15 is secured, at its lower end, to the movable upper portion 14 of the electric fan 13, 14, and, at its upper end, the yoke 15 is secured to the inner surface of the top of a hollow housing 16, of any suitable size and shape. Adjacent the lower, open end of the housing 16, the side walls thereof terminate in an annular portion 17 freely received within an annular recess 18 formed in the top of the pedestal 10 and surrounding the recess 11.

In order to permit the current of air produced by the electric fan, 13, 14, to issue from the housing 16, which incloses the fan, the front wall of the housing 16 is provided with a plurality of perforations 19, preferably arranged in an ornamental fashion so as to produce a pleasing effect. The housing 16 is also provided with a hinged door 20, preferably at the back thereof, by means of which access may be had to the electric fan 13, 14, when desired, without necessitating the removal of the same from the pedestal 10. The door 20 may be formed as a grille or provided with perforations to insure a free flow of air through the housing 16.

It is of course understood that the outer surface of the housing 16 may be ornamented or decorated in any desired manner to enhance the appearance of the same, and that the pedestal 10 may also be suitably decorated or ornamented.

In use, when the electric fan 13, 14, is being operated, the upper portion 14 thereof will oscillate or rotate upon its base 13, as is usual in electric fans of this type. As the housing 16 is carried by the upper portion 14 of the electric fan 13, 14, it will rotate therewith, and, therefore, the perforations 19 in the front wall of the housing 16 will be, at all times, properly positioned with respect to the electric fan 13, 14, to permit the current of air produced thereby to issue from the housing 16.

In case it is necessary to have access to the electric fan 13, 14, for any purpose, as, for example, in order to oil the same, it is merely necessary to open the door 20 at the back of the housing 16, thus avoiding the necessity of removing the electric fan 13, 14, and its inclosing housing 16 from the pedestal 10.

When a fan is not needed, as, for example, during the winter season, the electric fan 13, 14, and its inclosing housing 16 may be removed from the pedestal and a lamp, a jardinière, or a piece of statuary may be substituted in place thereof, it being understood that such lamp, jardinière or piece of statuary, as the case may be, should be provided with a support, similar to the support 12, to fit within and be received by the recess 11 in the upper portion of the pedestal 10.

Having thus described my said invention, what I claim and desire to secure by Letters Patent is:

1. An apparatus of the character described comprising an electric fan consisting of a base and a portion movable relatively thereto, and a perforated housing secured to said movable portion and inclosing said electric fan, substantially as specified.

2. An apparatus of the character described comprising an electric fan consisting of a base and an upper portion movably supported thereon, and a perforated housing secured to said movable upper portion and inclosing said electric fan, substantially as specified.

3. An apparatus of the character described comprising an electric fan consisting of a base and a portion movable relatively thereto, a member mounted upon said movable portion, and a housing secured to said member and inclosing said electric fan, substantially as specified.

4. An apparatus of the character described comprising an electric fan consisting of a base and a portion movable relatively thereto, a member mounted upon said movable portion and extending upwardly therefrom, and a perforated, hollow housing having a top and downwardly extending side walls and serving to inclose said electric fan, said housing being secured to said member, substantially as specified.

5. An apparatus of the character described comprising a pedestal having a recess in its upper portion, an electric fan supported upon said pedestal, and a perforated housing secured to said electric fan and inclosing the same, said housing having a top and downwardly-extending side walls, the lower portions of said walls extending within said recess, substantially as specified.

6. An apparatus of the character described comprising a pedestal having a recess in its upper portion, a support removably disposed within said recess, an electric fan mounted upon said support, and a perforated housing secured to said electric fan and inclosing the same, substantially as specified.

7. An apparatus of the character described comprising a pedestal having a recess in its upper portion, a support removably disposed within said recess, an electric fan mounted upon said support, said pedestal being provided in its upper portion with a second recess surrounding said first-named recess, and a perforated housing secured to said electric fan and inclosing the same, the lower portion of said housing extending within said second-named recess, substantially as specified.

8. An apparatus of the character described comprising a pedestal having an annular recess in its upper portion, an electric fan supported upon said pedestal, said electric fan consisting of a base and a portion movable relatively thereto, and a perforated housing secured to said movable portion and inclosing said electric fan, said housing having an annular lower portion freely received within said annular recess, substantially as specified.

Signed at the city of New York, in the county and State of New York, this first day of July, one thousand nine hundred and eighteen.

EMIL PHILLIPSON.

Witnesses:
CONRAD A. DIETERICH,
WILLIAM P. JONES.

It is hereby certified that the name of the assignee in Letters Patent No 1,328,055, granted January 13, 1920, upon the application of Emil Phillipson, of New York, N. Y., for an improvement in "Electric Fans," was erroneously given as "Plant & Company," whereas said name should have been given as *Plaut & Company*, as shown by the record of assignments in this office; and that the said Letters Patent should be read with this correction therein that the same may conform to the record of the case in the Patent Office.

Signed and sealed this 2d day of March A. D., 1920.

[SEAL.]

M. H. COULSTON,

*Acting Commissioner of Patents.*

Cl. 230—1.